C. H. SHUTT.
ELECTRICALLY CONTROLLED MECHANISM.
APPLICATION FILED MAY 16, 1916.

1,273,938.

Patented July 30, 1918.
4 SHEETS—SHEET 3.

Witness
H. P. Harwood
C. R. Ziegler

Inventor
Charles H. Shutt.
By Joshua R. H. Potts
His Attorney

C. H. SHUTT.
ELECTRICALLY CONTROLLED MECHANISM.
APPLICATION FILED MAY 16, 1916.

1,273,938.

Patented July 30, 1918.
4 SHEETS—SHEET 2.

Inventor
Charles H. Shutt.

Witness
H. P. Harwood.
C. R. Ziegler.

Joshua R. H. Potts.
His Attorney

UNITED STATES PATENT OFFICE.

CHARLES H. SHUTT, OF PHILADELPHIA, PENNSYLVANIA.

ELECTRICALLY-CONTROLLED MECHANISM.

1,273,938.

Specification of Letters Patent.   Patented July 30, 1918.

Application filed May 16, 1916.   Serial No. 97,878.

*To all whom it may concern:*

Be it known that I, CHARLES HARRISON SHUTT, a citizen of the United States, residing at Philadelphia, in the county of Philadelphia and State of Pennsylvania, have invented certain new and useful Improvements in Electrically-Controlled Mechanism, of which the following is a specification.

My invention consists of an improved electrically controlled mechanism, and is particularly serviceable as an apparatus for boiling eggs or cooking other articles a pre-determined length of time.

One object of my invention is to so construct an electrical time-controlled mechanism which will permit a bucket or other vessel to be lowered and remain lowered for a pre-determined time, and then automatically act to raise said vessel after the specified time has elapsed.

Another object of my invention is to so construct my improved mechanism that it will act exactly on time to raise the above mentioned vessel and automatically stop the raising of said vessel and hold it in the raised position.

A further object is to provide adjusting means so as to vary the position of certain of the elements to cause them to compensate for any wear or accidental movement so that the device may be maintained in order and to act with precision.

A still further object is to so construct the mechanism of my invention that any number of vessels may be simultaneously controlled from a common indicator.

These objects, and other advantageous ends which will be described hereinafter, I attain in the following manner, reference being had to the accompanying drawings in which—

Referring to the drawing, 1 is a casing or box having a back 2 made of slate or other insulating material and 3 is a motor having a worm 4 thereon which meshes with a worm wheel 5 on a shaft 6, the latter being journaled in suitable bearings of the casing 1, and has thereon another worm 7 which meshes with a worm wheel 8 secured to a vertical shaft 9, the latter being free to rotate within bearings 10 secured to the back 2 of the casing.

The upper end of the shaft 9 has slidably keyed to it by keys $10^a$, a disk 11 preferably made of iron or other material which will sustain magnetism, and this disk has on its upper face and adjacent the periphery, a metallic ring 12 of brass or other material which will not retain magnetism.

Above and in direct alinement with the shaft 9, is a shaft 13 having its upper end provided with a screw-thread 14. This shaft is free to rotate within bearings 15 and 16 supported on the back 2 but has no longitudinal movement. The lower end of the shaft 13 has rigidly keyed to it a cylindrical cup or casing 17 which is preferably made of iron, and has a central downwardly projecting sleeve 18 which forms the means whereby the shaft 13 is keyed to the cup and also forms one pole of a magnet as will hereinafter be described.

The casing 17 is of substantially the same diameter as the disk 11, and is also provided with a brass ring 19 which is directly above the ring 12, there being a small space between said two rings. The casing 17 provides a chamber for a coil of wire 20, and this coil of wire is insulated from the casing and has its opposite ends connected respectively to two rings 21 and 22 which are insulated from the casing and are arranged concentrically to each other, the ring 21 being of larger diameter than the ring 22, so that the latter fits within the ring 21 with a space separating these two rings so that there is no electrical connection between these two rings other than through the coil 20.

The support 16 has fixed thereto but insusulated therefrom by an insulator 23, two metallic brackets 24 and 25, the latter each having a small hollow cylinder 26 and a plunger 27. These plungers 27 are held in contact with respective rings 21 and 22 by coiled springs 28 within the cylinders and backed by adjusting nuts 29. One of the brackets 24 has a wire 30 leading thereto, and the other of said brackets has a wire 31 leading thereto. The other connecting points of these wires will be described later in the specification.

Two parallel guide rods 32 and 33 connect the supports 15 and 16, and a transverse two-ended arm 34 has holes therein through which the guide rods fit. The central portion of the arm 34 is provided with a threaded opening for the reception of the screw-threaded portion 14 of the shaft 13, so that it will be understood that when the latter rotates, the arm 34 will be moved upwardly or downwardly according to the direction of rotation.

The support 15 has a recessed portion providing a chamber for a spiral spring 35, one end of said torsion spring being secured to said support, while the other end of the spring is secured to the upper end of said shaft 13, the action of the spring being to turn said shaft 13 under certain conditions to lower the arm 34.

Figures 2, 6, 9, 11:
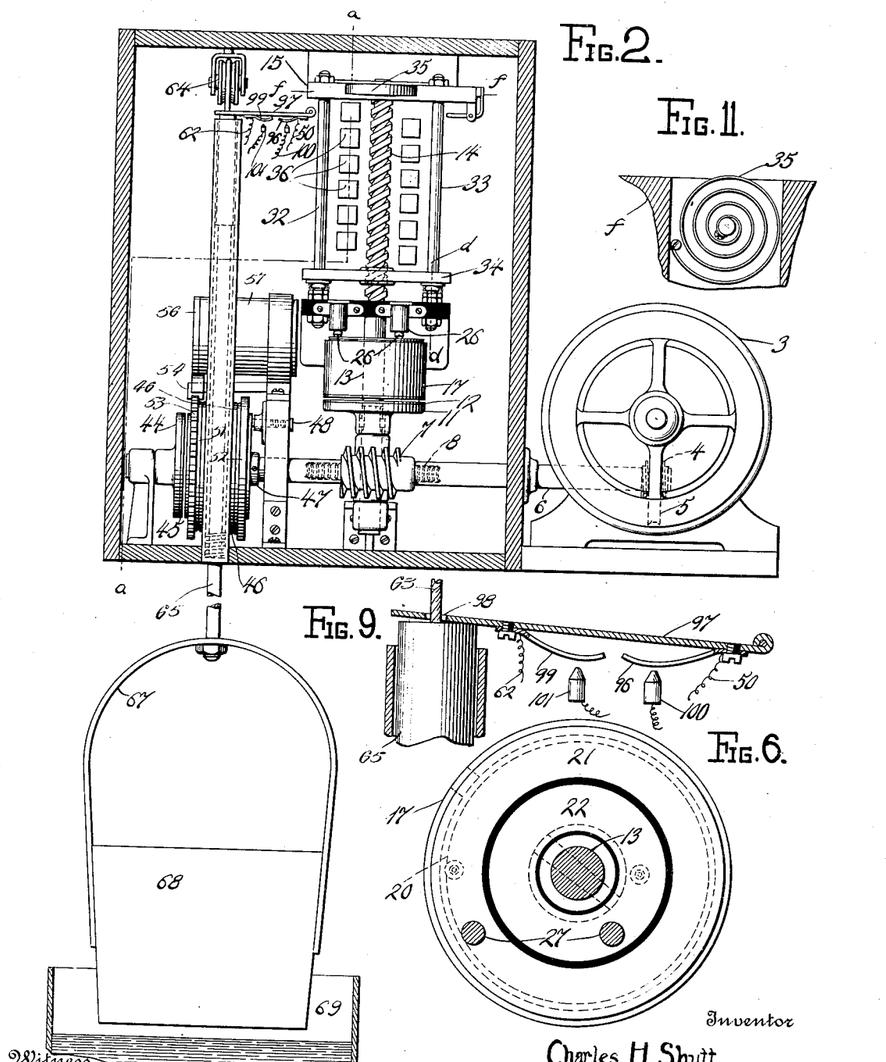
Fig. 2 is a front elevation of my invention showing a casing which I employ partially in section.
Fig. 6 is an enlarged sectional view taken on the line *c—c* of Fig. 5.
Fig. 9 is an enlarged fragmentary sectional elevation of certain of the elements shown in Fig. 2 in a different position from which they occupy in said Fig. 2.
Fig. 11 is a section on the line *f—f* of Fig. 2.

A series of contact plates 36 are secured to the back 2 by means of screws 37, these screws extending through vertical slots 38 so that the said contacting plates may be vertically adjusted on said back 2, and these plates are arranged as clearly shown in Fig. 2 in two columns which are spaced apart. The plates in each of the columns are also spaced apart, and the spacing of the plates is such that there is a gradual step formation upwardly from the lowest contacting plate in one column to the lowest contacting plate in the other column, and this stepped formation is continued alternatively from one plate in one column to another plate in the other column. This feature has a direct bearing on my invention.

Figures 4, 5:
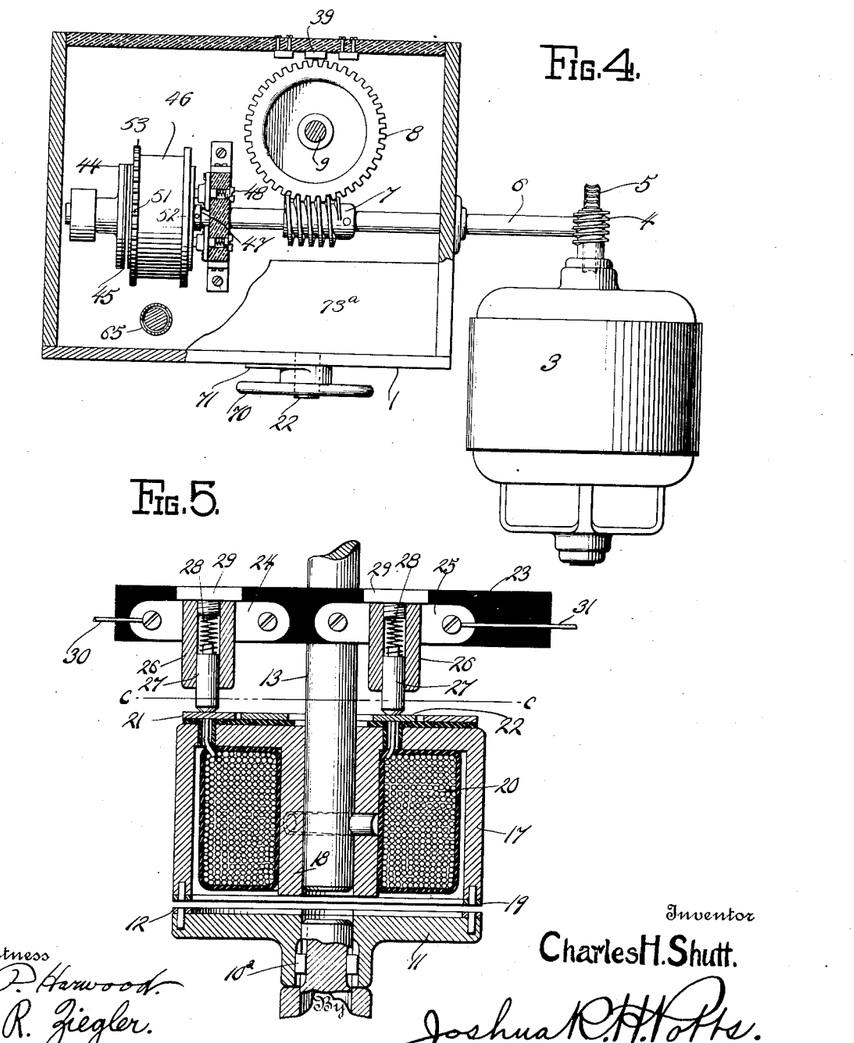
Fig. 4 is a section taken on the line *b—b* of Fig. 3.
Fig 5 is an enlarged sectional elevation of certain of the elements which I employ.

A single vertically extending contacting plate 39 (see Figs. 1 and 4) is secured to the back 2, and is positioned between the two columns of the contacting plates 36, and this plate 39 and the plates 36 have their outer surfaces substantially in the same plane and designed to be engaged by a contacting shoe 40 carried by the arm 34. The arm 34 is made of material which is a non-conductor of electricity, and has cavities 41 provided with compression springs 42, the latter acting against plungers 43 which are secured within the contacting shoe 40, so that the latter is normally held in an outward position to contact with the plates 36 and 39 during the movement of said screw-threaded portion 14 of the shaft 13, it being thought well to state here that the casing or cup 17, under certain conditions throughout the operation of my invention which will be fully described hereinafter, becomes magnetized due to the passing of an electric current through the coil 20, and that the disk 11 constantly rotating will, when the said casing 17 becomes magnetized, effect the rotation of the shaft 13 and screw thread 14 thereby causing the arm 34 to move upwardly into contact with the successive plates 36 and also along the plate 39.

The shaft 6 has thereon a disk 44 which is of the same construction as the disk 11, with the exception that the disk 44 is rigidly fixed on said shaft 6 and has no slidable movement whatever. This disk 44 is also provided with a brass ring 45 which is identical to the ring 12.

A winding drum 46 is freely rotatable on the shaft 6 and may slide longitudinally along said shaft 6 to a slight extent, that extent being limited by means of a collar 47 on the shaft 6 (see Fig. 2).

The body portion of the winding drum 46 is identical with the cup or casing 17 in every respect with the exception as above noted it is not keyed to the shaft, but is provided with a coil similar to the coil 20 and the ends of this coil are connected to concentric rings similar to the rings 21 and 22. These rings have contacting therewith two contacting plungers 48 (see Figs. 1 and 2), and these plungers 48 are electrically connected by wires 49 and 50, so that when the current passes through said wires in the manner hereinafter described, the coil within the drum will be energized and magnetism set up within the drum causing the drum to slide longitudinally along said shaft toward the disk 44, and the latter will then impart its movement to the drum to rotate the drum.

The drum has two annular flanges 51 and 52 which are spaced apart, and one of these flanges is provided with ratchet teeth 53, the latter being designed to be engaged by a pawl 54 which is pivoted at 55 to a magnet 56, said magnet having an electric coil 57 and when energized, will magnetically attract the pawl 54 to release the latter from the ratchet teeth 53.

The pawl 54 is normally held into engagement with the ratchet teeth by means of a tension spring 58, and it will be understood that the pawl 54 will act as the armature of said magnet, the flanged end 59 of the latter acting as one of the poles to move said armature against the action of the spring 58.

One end of the coil 57 is connected by means of a wire 60, the other end of the coil being connected by two wires 61 and 62 forming alternate circuits for a reason hereinafter set forth.

The drum 46 has secured thereto one end of a cord or other flexible member 63, the latter passing upwardly and around an antifriction pulley 64, the other end being connected to the upper end of a rod 65, the latter being vertically reciprocal within a tube 66 fixed in the casing 1. The rod 65 is connected to the handle 67 of a bucket or other vessel 68, the latter being designed to be lowered into a tank 69 of boiling water.

The outer surface of the casing 1 is provided with a hand wheel 70 having secured thereto an indicating pointer 71. This hand wheel and pointer are secured to a shaft 72 mounted in the casing, and the outer surface of the casing 1 has thereon a dial sector 73 having marks adjacent thereto indicating the exact durations of time at which the mechanism may be set to automatically raise the vessel 68 out of the tank 69. For example, these lines are marked "½ minute", "1 minute", etc.

Figure 1:
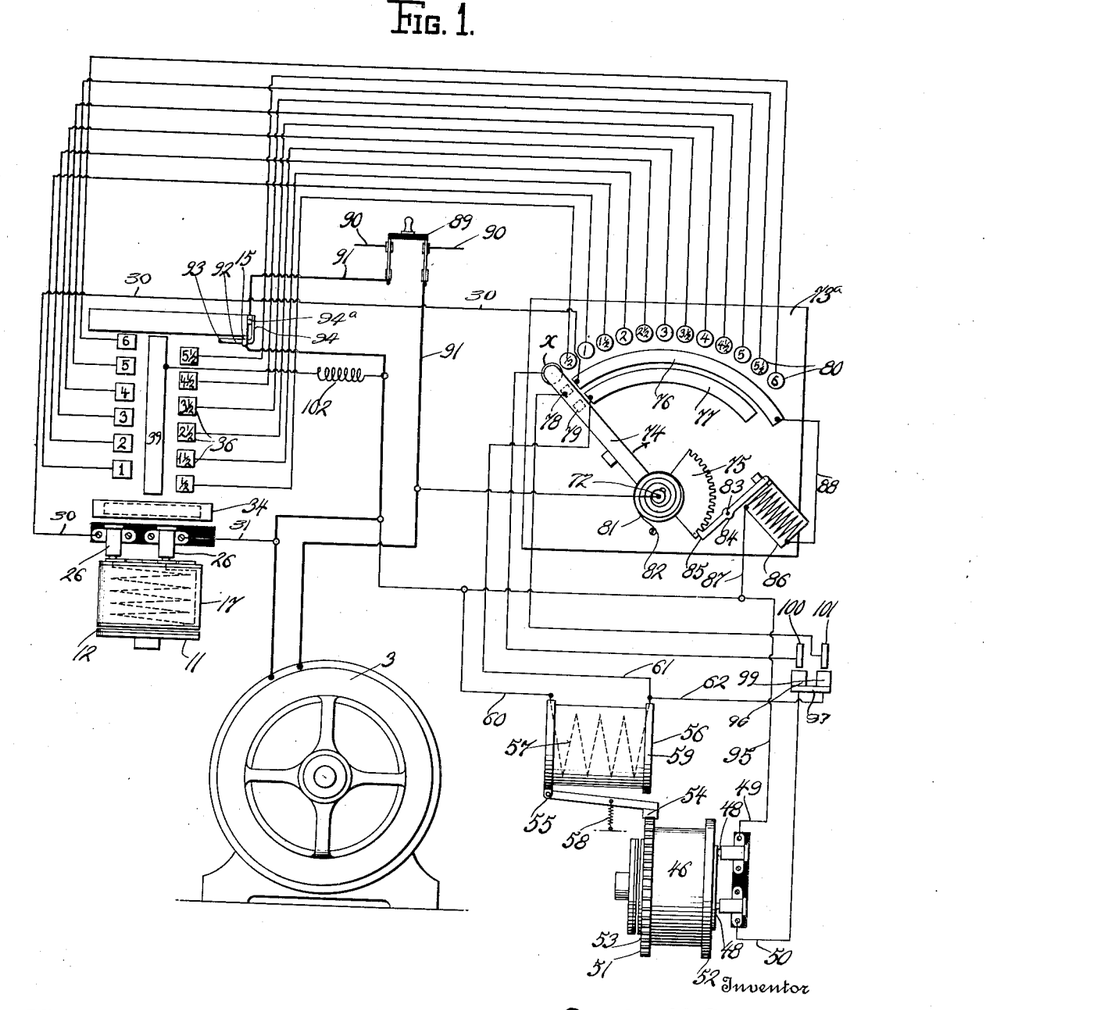
Figure 1 is a diagrammatic elevation showing the main elements of my invention with their electrical wire connection.
Figures 3, 7, 8, 10, 12:
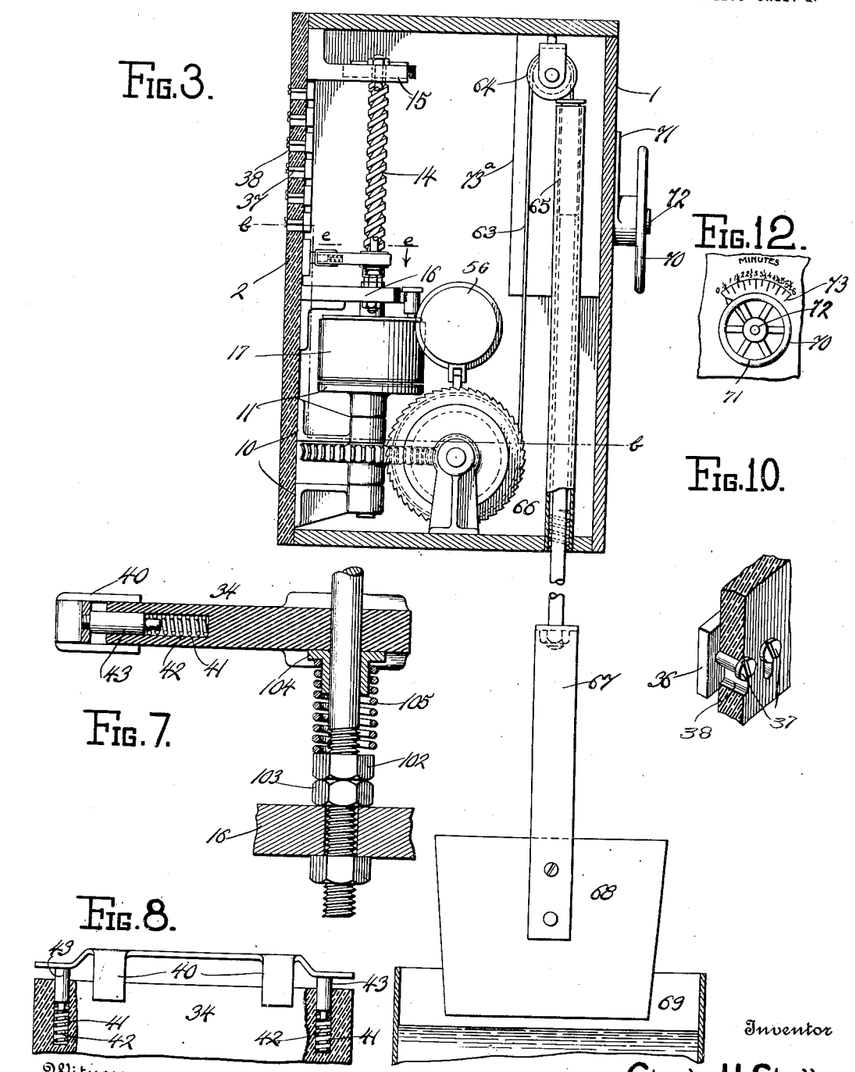
Fig. 3 is a section taken on the line *a—a* of Fig. 2 showing in outside view a guide tube which I employ.
Fig. 7 is an enlarged sectional view taken on the line *d—d* of Fig. 2.
Fig. 8 is a fragmentary sectional plan view of an elongated contacting shoe, taken on the line *e—e* of Fig. 3.
Fig. 10 is a fragmentary perspective partly in section of certain features of my invention.
Fig. 12 is a front elevation of an indicator forming a part of my invention.

The shaft 72 extends through the outer portion of the casing and into an inner casing 73ª, the latter being shown in outside view in Fig. 3, and diagrammatically on Fig. 1. This shaft 72 has fixed thereon a metallic arm 74 and a toothed quadrant 75, the latter being made of material which is a non-conductor of electricity, there being a number of such materials now on the market which are sufficiently hard to withstand the frictional wear required by the quadrant 75.

Two segmental metallic plates 76 and 77 are secured within the casing 73 and arranged concentrically with the axis of the shaft 72, and two small contacting plates 78 and 79 are located directly adjacent the ends of said segmental plates 76 and 77. Furthermore, a series of contacting plugs 80 are arranged concentrically to the axis of the shaft 72, it being noted that the arm 74 is capable of contacting with all of said plugs and with the segmental plates and with the plates 78 and 79.

The arm 74 is held in the position which it occupies in Fig. 1 by means of a spiral spring 81. This spiral spring has its opposite ends attached to the shaft 72 and to a lug 82 on the inner surface of the casing 73ª. Furthermore, it will be noted that if the arm 74 is moved on its shaft in the direction of the arrow shown in Fig. 1, that the action of the spring 81 is to return the said arm to the position occupied in Fig. 1. As a means for holding the arm 74 in its different positions in contact with different plugs 80, I provide a lever 83 which is pivoted at 84 at a point between its ends, and one end of this lever has an extension 85 designed to engage with the spaces between the teeth of the segment 75, the other end of the lever being directly adjacent an electro-magnet 86 having wires 87 and 88 connected thereto, so that when this electromagnet 86 is energized, the end 85 of the lever 83 will be held in contact with the teeth of the segment 75 and prevent the returning of the arm 74 to its initial position after it has once been moved in the direction of the arrow shown in Fig. 1, it being noted that the electro-magnet 86 attracts the opposite end of the lever 83 which action throws the end 85 forward into contact with said toothed segment.

If, however, the electro-magnet 86 becomes deënergized or if the current within this magnet is weakened as it is in one of the stages of the operation of my mechanism as will be hereinafter set forth, the spring 81 will rotate the segment 75 and the teeth of the latter will push the extension 85 of the lever 83 out of engagement therewith. After the lever 83 has been thus disengaged from the segment 75, the spring 81 will move the arm 74 into its initial position.

As shown in Fig. 1, each of the plugs 80 has a wire connecting it with a respective contacting plate 36, and for convenience of description these plugs and plates have markings thereon which indicate the duration of time necessary to elapse before the vessel 68 is raised from the boiling water in the tank 69. For example, the first plug to the right of the plug marked "x" in Fig. 1, is marked with the fraction "¼," and the extreme lowest contacting plate 36 is also marked with a fraction "¼," and this contacting plate and plug are connected by a wire as clearly shown. In this same manner each successive plug is wired with the respective contact plates 36.

A main switch 89 is located in any convenient place on the casing 1, and wires 90 leading from the source of supply connect with this switch 89. The main circuit wires 91 connect this switch directly with the motor 3, there being a circuit breaking switch 92 interposed within the main circuit formed by the wires 91, and this switch has an outwardly projecting end 93 pivotally connected to the support 15 and another arm 94 which is movable into and out of engagement with a block 94ª to which one portion of the wire 91 is connected. Another end of the wire 91 is in electrical connection with the arm 94, so that when said latter arm is in contact with the block, the circuit is complete and the motor 3 will be running; however, if the arm 93 is moved upwardly, the circuit will be broken between the arm 94 and said latter block, and the motor 3 will be stopped and there will be no flow of the current through any of the other wires in the mechanism.

I have therefore so located the arm 93 adjacent the upper support 15 that if for any reason during the operation of the mechanism the arm 34 would continue to move upwardly after it had once contacted with the uppermost of the plates 36, said arm 34 will strike the arm 93 and break the circuit, thereby preventing injury to any of the several parts. This switch 92 therefore, will hereinafter be termed a "safety switch."

The other electric wiring of my improved mechanism will be readily understood from Fig. 1, and it will be noted that the wire 30 which connects the bracket 24 also has an electrical connection with the segmental plate 76, and the latter is connected to the opposite end of the wire 88.

The wire 87 is connected to the main circuit wire, and has a fixed wire 95 which connects with one of the brackets 48, the wire 50 connecting the other of the brackets 48 with a metallic contacting spring 96, the latter being carried by a hinged plate of non-conducting material 97. The latter has its free end provided with an opening 98 through which the cord 63 passes, and the lower face of this plate is designed to be engaged and moved upwardly by the upper end of the rod 65.

Another spring contact-member 99 is secured to the hinged plate 97, and these springs 96 and 99 are designed to engage contacts 100 and 101 when the said rod is in its lowered position, and are so designed as to be moved out of contact with said contacts 100 and 101 when the rod 65 moves the plate 97 upwardly (see Fig. 9).

The spring member 99 is in electrical connection with the wire 62, and the contacts 100 and 101 are in electrical connection with the plug "x" and the contacting plate 78 respectively. The wire 61 is connected with the segmental plate 77, and the wire 60 is in electrical connection with a lead to the main circuit. The elongated contacting plate 39 is in connection with the main circuit and includes a shunt coil 102, the function of this coil and its corresponding circuit being to effect a weakening of the current within the electro-magnet 86 as before mentioned, and hereinafter more fully referred to.

It will be further noted that the indicating lines on the outer surface of the casing having a direct relation to the plugs 80, and that when the pointer 71 is opposite one of the lines, such for example as the line marked "3 minutes," the arm 74 will have been moved into contact with the plug 80 which is numbered "3," representing "3 minutes."

The operation of my invention is as follows:

Considering that the vessel 68 is in a raised position as shown in Figs. 2 and 3, and that the arm 74 is in contact with the plug "x" and the plate 78, the indicating pointer 71 is turned and consequently the arm 74 is also turned until the indicator is opposite the line which is marked for the time which the vessel is to be allowed to remain in the boiling water within the tank 69.

This movement of the arm 74 causes the formation of electric circuits through the magnets 86 and 56 to energize them and cause them to respectively move the lever 83 into engagement with the segment 75 and to move the pawl 54 from the ratchet 51, thereby permitting the vessel 68 to be lowered into the tank. In order to energize the magnet 86 as just described, the current passes from the wire 91, through the arm 74, segmental plate 76, wire 88, thence through the magnet and the wire 87 to the other of the main feed wires 91. The current to energize the magnet 56 passes from one of the main wires 91 through the arm 74, segmental plate 77, wire 61, thence through the magnet 56 and the wire 60 to the other of the main feed wires 91.

The above mentioned movement of the arm 74 also causes the electric current to flow through the coil 20 of the casing 17, through the medium of one of the main feed wires 91, arm 74, segmental plate 76, wires 30 and 31, thence to the other of the main feed wires 91, and thereby magnetize the casing 17. Due to this magnetism the constantly rotating disk 11 will impart motion to the casing 17 and consequently to the shaft 13 and screw-threaded portion 14, thereby raising the arm 34 and contacting shoe 40 until said shoe comes in contact with the plate 36 which corresponds with the mark to which the indicator is set.

After the indicator lever has been moved to a respective indicating contact, the contact plate moves upwardly on the screw until it reaches the designated contact plate which corresponds with the one against which the indicating lever is set. This forms a shunt circuit thereby weakening the current which is passing through the magnet holding the indicating lever in its said position and the torsion spring being stronger than the resistance of the magnetic pawl, will return the lever to its normal position. When in this position and it is considered that the members 96 and 99 are in contact with the members 100 and 101 for the reason that the rod which holds the bucket 68 is in its lowest position, the current will pass through the winding drum magnet and the retaining pawl magnet for the winding drum and thereby release the pawl and energize the winding drum magnet so as to wind up the bucket rope.

After the bucket has risen to a pre-determined height, the top of the slidable rod again separates the members 96 and 99 from the members 100 and 101, thereby deenergizing both the winding drum magnet and the magnet which operates the pawl, therefore permitting the pawl to engage the ratchet on the winding drum and lock the latter.

It will be noted that as the number of rotations per minute of the motor is known, and that the worms and worm wheels have been so designed as to effect the rotation of the shaft 13 at the rate of one revolution per minute, it will require just three minutes for the arm 34 to move upwardly until the shoe 40 contacts with the "3 minute" plate 36. Thus one full thread represents a length of one half inch and the bottom of the three inch plate is one and one-half inches up from the starting point of the contact plate.

When the contacting shoe 40 engages the "3 minute" plate 36, a shunt circuit is produced, it being understood that the shoe 40 always contacts with the elongated plate 39, and thereby produces a circuit between this plate 39 and any other of the plates 36, so that as just described, said shunt circuit is formed due to the connection provided by the shoe 40 between the elongated plate 39 and the said contacting plate 36. This shunt circuit causes a weakening in the current which passes through the electromagnet 86 which holds the indicating lever opposite the "3 minute" mark at which it was originally set, and since the spring 81 exerts a stronger action on the shaft 72 than does the weakened coil 86, said spring 81 causes the arm 74 to be automatically returned to its initial position as shown in Fig. 1.

When in this position, and remembering that the lowering of the vessel as above described permitted the spring fingers 96 and 99 to respectively engage their contacts 100 and 101, the current will pass through one of the main wires 91, arm 74, contact plate 78, contact 101, spring 99, wire 62, coil 56, wire 60 to the other of the main feed wires 91 to energize said magnet 56 and withdraw the pawl 54 to free the drum. Current will also pass through the arm 74, plug "x," contact 100, spring 96, wire 50, plungers 48, wire 49 to the latter mentioned main feed wire 91, and the drum 46, through magnetic connection with the rotating disk 44, will raise the vessel 68 out of the tank 69. This raising action will occur until the upper end of the rod has engaged the plate 97, thereby again moving the spring members 96 and 99 out of engagement with their contacts 100 and 101, thereby cutting off the circuit to the winding drum and to the pawl actuating coil when the spring 58 will move the pawl into contact with the ratchet teeth and prevent the downward movement of said vessel.

If, owing to wear or improper setting of the mechanism, the arm 34 is required to move a greater distance than it can possibly do in the timing of the several movable parts of my improved mechanism, I may compensate for this difference in the following manner:

The lower ends of the guide rods 32 and 33 are threaded and engage threaded openings in the lower support 16 and nuts 102 and 103 engage the threaded portion of these guide rods (see Fig. 7). I also mount small sleeves on the rods 32 and 33, said sleeves having flanged portions 104 for engagement with the upper ends of expansion springs 105, the lower ends of said springs engaging the upper face of the nut 102.

With this construction it will be noted that by turning the nut 102 upwardly, the spring 105 will be compressed and will in turn cause a slight raising of the arm 34, so that when the casing 17 starts to rotate, the arm 34 will begin its movement at a level slightly above the level which it occupied before the nut 102 was turned; therefore if there is any sagging due to wear as above described, this sagging may be compensated by the movement of the nuts 102 upwardly, and the nuts 103 may be then turned upwardly to jam or lock the nuts 102 in the upper position, so that no vibration will tend to loosen said nuts 102. In this same connection the contacting plates 36 may be adjusted upwardly or downwardly by loosening the screws 37, this adjustment being made when it is desired to slightly change the location of said plates 36.

The spring 35 which is mounted in the support 15 acts to turn the screw-threaded portion 14 in a direction to lower the arm 34 after the magnetic casing 17 is deënergized.

Furthermore, it will be noted that the plungers 27 and 48 act to provide the electric current permitting the magnetic casing 17 and drum 46 to rotate and still be in electrical connection during rotation.

The function of the brass rings 12 and 19 on the disk 11 and casing 17 respectively and also the corresponding brass rings which co-act with the winding drum 46 are to provide an instant release of the magnetism when the respective coils are deënergized, it being noted that the brass will not retain the magnetism and that a quick release between the disks and their co-active magnetic casing is thereby assured, and I prefer to use these rings for the reason that if I did not use them there might be a slight permanent magnetism set up between the several parts which would prevent the immediate release of the elements if these brass rings were not employed. This is due to the fact that iron may include sufficient foreign matter such as carbon or the like which would be sufficient to retain a certain amount of magnetism even after the coils became de-energized.

While I have illustrated and described my invention as being operative to raise and lower one vessel 68, it will be noted that any number of vessels 68 may be operated, it merely being necessary to duplicate certain features of the mechanism, and all of the mechanisms can be operated through the action of the indicating mechanism as above described.

With the construction as above described, it may be considered that the motor is rotating at seventeen hundred (1700) revolutions per minute, and that the worm wheels each have forty-one teeth, also that the pitch of the threaded portion 14 is sufficient to raise the arm 34 a distance equal to the distance between the lower edges of the two lower-most contacting plates 36 in one minute.

However, it will be understood that motors of different speed may be used, it being merely necessary to so distribute the power from the motor that the screw-threaded portion 14 will rotate at such a speed as to give the above mentioned result.

It will be noted that the wire coil 20 and the casing or cup 17 produces an electro-magnet as does also the drum 46 with its coil, and in some instances in the claims I have broadly referred to these members as electro-magnets.

While I have stated that the toothed quadrant 75 is of non-conducting material, it may in some instances be made of steel or other material. The contact 79 has no electrical connection, but merely acts as a rest for the contact arm 74.

Also, while I have named the member 63 as a cord, it will be understood that a chain or other flexible connection may be used without departing from my invention.

Furthermore, I have termed the members 27 and 48 as plungers, but it will be noted that these members act as contacting brushes to form electrical connection with their respective electro-magnets.

Also, I preferably make the shaft 6 of brass or bronze, so as not to retard the longitudinal movement of the winding drum along said shaft.

While I have described my invention as taking one particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The combination of a main drive member, a winding drum, means controlled electrically for coupling the drive member to said drum, electrically connected means, a member movable into engagement with said means to cause the operation of said first means to couple the drive member and the drum to cause said drum to be turned, a plurality of electrically connected contacts, an indicator including means movable into engagement with said contacts to electrically control the movement of said latter member, said latter member being operative after a lapse of time pre-determined by the setting of said indicator to complete an electric circuit with said first means to cause the drum to rotate with said first drive member, and electrically controlled means automatically operative through the medium of said second mentioned member during said operative movement thereof, to return the indicator to its initial position, substantially as described.

2. The combination of a main drive member, a winding drum, means controlled electrically for coupling the drive member to said drum, electrically connected means, a member movable into engagement with said means to cause the operation of said first means to couple the drive member and the drum to cause said drum to be turned, a plurality of electrically connected contacts, an indicator including means movable into engagement with said contacts to electrically control the movement of said latter member, said latter member being operative after a lapse of time pre-determined by the setting of said indicator to complete an electric circuit with said first means to cause the drum to rotate with said first drive member, electrically controlled means automatically operative through the medium of said second mentioned member during said operative movement thereof, to return the indicator to its initial position, and means operative by the movement of said drum to cut off the electric current from said first means, substantially as described.

3. The combination of a main drive member, a winding drum, means controlled electrically for coupling the drive member to said drum, electrically connected means, a member movable into engagement with said means to cause the operation of said first means to couple the drive member and the drum to cause said drum to be turned, a plurality of electrically connected contacts, an indicator including means movable into engagement with said contacts to electrically control the movement of said latter member, said latter member being operative after a lapse of time pre-determined by the setting of said indicator to complete an electric circuit with said first means to cause the drum to rotate with said first drive member, electrically controlled means automatically operative through the medium of said second mentioned member during said operative movement thereof, to return the indicator to its initial position, means operative by the movement of said drum to cut off the electric current from said first means, and means automatically operative to return said second mentioned member to its initial position when said current is cut off, substantially as described.

4. The combination of a main drive member, a winding drum including an electro-magnet, means including a second electro-magnet and a member movable in conjunction with the second electro-magnet when the latter is energized, an indicator, said indicator being in electrical connection with said second magnet, and operative when moved to cause the second electro-magnet to be energized and the operation of said latter member, said latter member after a pre-determined movement being operative to effect the passage of current through the electro-magnet of the said drum and thereby provide a magnetic connection between the drum and the main drive to turn the drum, means operative by the movement of said drum to cut off the current in said electro-magnets, and means for automatically returning said latter member to its initial position, substantially as described.

5. The combination of a main drive member, a winding drum including an electro-magnet, a member including a second electro-magnet, an indicator, said indicator being in electrical connection with said second magnet and operative when moved to cause the operation of said latter member, said latter member after a pre-determined movement being operative to effect the passage of current through the electro-magnet of said drum and thereby provide a magnetic connection between the drum and the main drive member to turn the drum, means operative by the movement of said drum to cut off the current to said electro-magnets, means automatically operative upon said cutting off of current to return said latter member to its initial position, and electrically controlled means automatically operative through the medium of said second mentioned member during said operative movement thereof, to return the indicator to its initial position, substantially as described.

6. The combination of a main drive shaft, a drum free to rotate on said shaft, said drum including an electro-magnet, a member fixed to said shaft and having a portion designed to be attracted by said magnet and thereby rotate said drum, a second shaft operatively connected with said first shaft, a third shaft having an electro-magnet secured thereto, a member connected to said second shaft and capable of being magnetically connected with said electro-magnet on the third shaft when the latter magnet is energized and, through magnetic connection with said electro-magnet, to rotate said third shaft, means movable by said third shaft and operative after a pre-determined movement of said shaft to cause current to flow through the electro-magnet of said winding drum, and means actuated by said winding drum to cut off the current from said electro-magnets, substantially as described.

7. The combination of a main drive shaft, a drum free to rotate on said shaft, said drum including an electro-magnet, a member fixed to said shaft and having a portion designed to be attracted by said magnet and thereby rotate said drum, means movable by said shaft and operative after a pre-determined movement of said shaft to cause current to flow through and energize the electro-magnet to cause said winding drum to rotate, means actuated by said winding drum to cut off the current from said electro-magnet, and means for locking said drum, said locking means being operative to release said drum to permit a free motion thereof when the electro-magnet of the drum is deënergized, said locking means also being operative to release said drum when the electro-magnet thereof is energized to cause the rotation thereof, substantially as described.

8. The combination of a main drive shaft, a rotatable drum, electrically controlled means for coupling said drive shaft and drum, a second shaft operatively connected with said first shaft, a third shaft having an electro-magnet secured thereto, a member connected to said second shaft and capable of being magnetically connected with said electro-magnet on the third shaft when the magnet is energized and, through magnetic connection with said electro-magnet, to rotate said third shaft, said third shaft having a threaded portion, an arm having a threaded opening through which the threaded portion of the third shaft extends so that a rotation of said threaded portion causes a movement of said arm, a contacting shoe on said arm, a supporting structure, a series of contacting plates on said supporting structure and designed to be successively engaged by said contacting shoe, means forming electric connection with said contacting plates, means for operating said first coupling means to rotate the drum, an indicator, means forming an electrical connection between the indicator and the contacting plates and between the indicator and said coupling means of the drum, said indicator including a member movable into electrical contact with certain of said plates, said contacting shoe acting to complete the circuit between said electrically connected plates to cause electric current to actuate said first electrically controlled means to couple the drive shaft and drum and thereby effect the operation of the drum, and means operated by said movement of the drum to cut off the current to the magnet and first electrically controlled means, and means for automatically moving said third shaft to return the contacting shoe to its initial position, substantially as described.

9. The combination of a main driving member, a winding drum including an electro-magnet operative when energized to magnetically connect the drum to be rotated by the main shaft, a second electro-magnet when energized being operative through the medium of magnetism to receive motion from said main driving member, a series of contacting plates, an indicator including contact members in electric connection with said contacting plates, means operated by said second electro-magnet and movable into contact with said plates to form a connection with certain of said plates, said indicator including an arm movable to close a circuit between said latter plates and certain of the first-mentioned contact members of the indicator whereby a current is set up in said electro-magnet of the drum to turn the drum, an electro-magnet, means for electrically connecting said electro-magnet with certain of the members of said indicator whereby the latter magnet is energized, and a pawl operated by said latter magnet for engagement with the drum to prevent rotation thereof, said latter electro-magnet when energized acting to release the pawl from the drum, substantially as described.

10. The combination in electrically controlled mechanism, of a rotatable electro-magnet having a threaded shaft connected therewith, an arm having a threaded opening through which the threaded shaft extends, a main driving member, means for energizing said electro-magnet to magnetically connect the electro-magnet with the driving member, a series of contacting plates, a winding drum, an indicator, an electro-magnet included with said winding drum, means electrically connecting the plates and the electro-magnets, a contacting shoe on said arm successively movable into contact with the plates, an arm on said indicator movable to cause certain of said plates to be electrically connected, said shoe being operative to form a circuit between said electrically connected plates to energize said winding drum magnet and magnetically connecting the winding drum with the main drive member to rotate said drum, substantially as described.

11. The combination in electrically controlled mechanism, of a rotatable electro-magnet having a threaded shaft connected therewith, an arm having a threaded opening through which the threaded shaft extends, a main driving member, means for energizing said electro-magnet to magnetically connect the electro-magnet with the driving member, a series of contacting plates, a winding drum, an indicator, an electro-magnet included with said winding drum, means electrically connecting the plates and the electro-magnets, a contacting shoe on said arm successively movable into contact with the plates, an arm on said indicator movable to cause certain of said plates to be electrically connected, said shoe being operative to form a circuit between said electrically connected plates to energize said winding drum magnet and magnetically connecting the winding drum with the main drive member to rotate said drum, and means operative by said drum to deënergize said magnets, substantially as described.

12. The combination in electrically controlled mechanism, of a rotatable electro-magnet having a threaded shaft connected therewith, an arm having a threaded opening through which the threaded shaft extends, a main driving member, means for energizing said electro-magnet to magnetically connect the electro-magnet with the driving member, a series of contacting plates, a winding drum, an indicator, an electro-magnet included with said winding drum, means electrically connecting the plates and the electro-magnets, a contacting shoe on said arm successively movable into contact with the plates, an arm on said indicator movable to cause certain of said plates to be electrically connected, said shoe being operative to form a circuit between said electrically connected plates to energize said winding drum magnet and magnetically connecting the winding drum with the main drive member to rotate said drum, means operative by said drum to deënergize said magnets, a spring for rotating said threaded shaft to move said contacting shoe into its initial position, substantially as described.

13. The combination in electrically controlled mechanism, of a main drive member, a drum freely rotatable thereon and including an electro-magnet, means for supplying current to the electro-magnet, a slidable rod, a bucket secured to one end of the rod, a flexible cord having one end secured to the rod and the other end secured to the winding drum, a hinged plate having contacting members thereon, electric contacts capable of engagement with said members to complete the circuit through said electro-magnet and thereby magnetically connect the drum with the main drive member to effect the rotation of said drum, said drum being operative to move said cord and rod, said rod being so designed as to engage and move said plate and thereby break the electric circuit and deënergize the electro-magnet, and means movable to simultaneously lock said drum when its magnet is deënergized, the locking being rendered operative by said breaking of the circuit, substantially as described.

14. The combination of a main driving member, a winding drum including an electro-magnet, locking means for the drum including an electro-magnet, an indicator initially movable to effect the movement of said locking means to permit the drum to be freely turned, means including an electro-magnet and movable to effect passage of current through the first electro-magnet to magnetically connect said drum with the main driving member, means operative by the free turning of the drum to effect the operation of said movable means to cause the passage of electric current through the first-mentioned magnet to rotate the drum, said operation of the movable means also effecting the automatic return of the indicator to its initial position thereby deënergizing the magnet of said movable means, said operative means being automatically operated by said latter turning of the drum to break the electric circuit, substantially as described.

15. The combination of a main driving member, a winding drum including an electro-magnet, locking means for the drum including an electro-magnet, an indicator initially movable to effect the movement of said locking means to permit the drum to be freely turned, means including an electro-magnet and movable to effect passage of current through the first electro-magnet to magnetically connect said drum with the main driving member, means operative by the free turning of the drum to effect the operation of said movable means to cause the passage of electric current through the first-mentioned magnet to rotate the drum, said operation of the movable means also effecting the automatic return of the indicator to its initial position thereby deënergizing the magnet of said movable means, said operative means being automatically operated by said latter turning of the drum to break the electric circuit, and means operative when the current is broken to move the locking means to lock the drum, substantially as described.

16. The combination of a main driving member, a winding drum including an electro-magnet, a locking member for the drum including an electro-magnet, an indicator manually movable to effect the movement of said locking member to permit the drum to be freely turned, said indicator including an arm provided with a toothed segment, an electro-magnet and a lever movable into engagement with the toothed segment when the latter magnet is energized, means including an electro-magnet and movable to effect passage of current through the first electro-magnet to magnetically connect said drum with the main driving member, means providing a shunt circuit between said latter means and the magnet of the indicator whereby the current in the latter magnet is weakened, and means for automatically moving the arm when said current is weakened, substantially as described.

17. The combination of a supporting structure, a shaft having an electro-magnet thereon operative to effect the rotation of said shaft, said shaft having a screw-threaded portion, a series of contacting plates adjustably mounted on said supporting structure, an arm having a threaded opening in engagement with said threaded portion of the shaft, a contacting shoe on said arm for engagement with said contacting plates, guide rods on said supporting structure, and means on said guide rods forming an adjustable stop for said arm, substantially as described.

18. The combination of a supporting structure, a shaft having an electro-magnet thereon operative to effect the rotation of said shaft, said shaft having a screw-threaded portion, a series of contacting plates adjustably mounted on said supporting structure, an arm having a threaded opening in engagement with said threaded portion of the shaft, a contacting shoe on said arm for engagement with said contacting plates, guide rods on said supporting structure, means on said guide rods forming an adjustable stop for said arm, said stop including resilient means, means operative on said resilient means for moving the latter, and means for locking the resilient means in said moved position, substantially as described.

19. The combination of a supporting structure, a shaft having an electro-magnet thereon operative to effect the rotation of said shaft, said shaft having a screw-threaded portion, a series of contacting plates adjustably mounted on said supporting structure, an arm having a threaded opening in engagement with said threaded portion of the shaft, a contacting shoe on said arm for engagement with said contacting plates, guide rods on said supporting structure, means on said guide rods forming an adjustable stop for said arm, and a spring for rotating said shaft to move said arm into contact with said stop, substantially as described.

20. The combination of a main drive member, a winding drum including an electro-magnet, a locking member for the drum including an electro-magnet, an indicator manually movable to effect the movement of said locking member to permit the drum to be freely turned, said indicator including an arm, a securing device for the arm movable by an electro-magnet, said latter electro-magnet when energized serving to operate said device to secure the arm, means including another electro-magnet and movable to effect passage of current through the first electro-magnet to magnetically connect said drum with the main driving member, means providing a shunt circuit between said latter means and the magnet of the indicator whereby the current in the latter magnet is weakened, and means for automatically moving the arm when said current is weakened, substantially as described.

21. The combination of a supporting structure, a shaft having an electro-magnet thereon operative to effect the rotation of said shaft, said shaft having a screw-threaded portion, a series of contact plates adjustably mounted on said supporting structure, an arm having a threaded opening in engagement with said threaded portion of the shaft, a contacting shoe on said arm for engagement with said contact plates, guide rods on said supporting structure, means on said guide rods forming a stop for said arm, and a spring for rotating said shaft to move said arm into contact with said stop, substantially as described.

In testimony whereof I have signed my name to this specification in the presence of two subscribing witnesses.

CHARLES H. SHUTT.

Witnesses:
RHODA E. GILLIES,
CHAS. E. POTTS.